(12) United States Patent
Warikoo

(10) Patent No.: US 11,343,264 B2
(45) Date of Patent: May 24, 2022

(54) SYSTEM AND METHOD FOR DETERMINING THE CONFIDENCE LEVEL IN ATTRIBUTING A CYBER CAMPAIGN TO AN ACTIVITY GROUP

(71) Applicant: Arun Warikoo, Princeton, NJ (US)

(72) Inventor: Arun Warikoo, Princeton, NJ (US)

( * ) Notice: Subject to any disclaimer, the term of this patent is extended or adjusted under 35 U.S.C. 154(b) by 240 days.

(21) Appl. No.: 16/813,605

(22) Filed: Mar. 9, 2020

(65) Prior Publication Data
US 2021/0281585 A1  Sep. 9, 2021

(51) Int. Cl.
*H04L 29/06* (2006.01)

(52) U.S. Cl.
CPC ...... *H04L 63/1416* (2013.01); *H04L 63/1441* (2013.01)

(58) Field of Classification Search
CPC ............. H04L 63/1416; H04L 63/1441; H04L 63/1408; H04L 63/1433
See application file for complete search history.

(56) References Cited

U.S. PATENT DOCUMENTS

| | | | |
|---|---|---|---|
| 8,201,257 B1* | 6/2012 | Andres | G06F 21/568 726/25 |
| 10,834,103 B2* | 11/2020 | Balasundaram | H04L 63/1433 |
| 2016/0378978 A1* | 12/2016 | Singla | H04L 63/1433 726/23 |

* cited by examiner

*Primary Examiner* — Ali S Abyaneh

(57) ABSTRACT

A system and method is provided for determining the confidence level in attributing a cyber campaign to an activity group. The system and method allows for determining information gaps that need to be filled in order to perform attribution with higher degree of confidence. The system and method is able to extract quantitative data from the campaign intrusion set data and perform a multi-stage analysis and comparison with quantitative data extracted from threat intelligence feeds/platforms and/or vendor intelligence reports. This allows for identifying an activity groups that may be attributed for the campaign with the associated level of confidence.

1 Claim, 4 Drawing Sheets

| COLUMN NAME | VALUE | TYPE | WEIGHT |
|---|---|---|---|
| Activity Group ID | 001 | Informational | 0 |
| Activity Group Name | Wizard Spider (Crowdstrike) | Informational | 0 |
| Activity Group Alias | TEMP.MixMaster (FreEye) | Informational | 0 |
| Sector | Government Agencies<br>Municpalities<br>Pharma | Informational | 0 |
| Tools Used | Emotet<br>Trickbot<br>PSEXEC<br>Ryuk | Correlation Datapoint | 5 |
| Tactics | Initial Access (TA001)<br>Execution (TA002)<br>Persistence (TA003)<br>Defensive Evasion (TA005)<br>Lateral Movement (TA008)<br>Discovery (TA007) | Correlation Datapoint | 2 |
| Techniques | Powershell Script (T1086)<br>Network reconnaissance (T1046)<br>RDP (T1076) | Correlation Datapoint | 5 |
| Unique Indicators | Ryuk | Correlation Datapoint | 10 |

SYSTEM AND METHOD FOR DETERMINING THE CONFIDENCE LEVEL IN ATTRIBUTING A CYBER CAMPAIGN TO AN ACTIVITY GROUP

BACKGROUND OF THE INVENTION

The present invention relates to cyber-attacks and, more specifically, to cyber threat attribution of an ongoing campaign.

Advanced Persistent Threats (APTs) have caused much grief over the years to organizations, both government and private. APTs are highly sophisticated, multi-stage and targeted cyber-attacks that have led to an increased demand on tracking threat actor groups and attribution for such campaigns. Cyber threat attribution is the process of associating a targeted cyber-attack against an adversary. Cyber threat attribution is fast becoming an important component in cyber defense operations. Determining cyber threat attribution enables an organization to understand the adversaries modus operandi and the adversary's objective. This allows organizations to augment their defenses, thereby, preventing future cyber-attacks. However, cyber threat attribution is not an easy task. Advanced actors constantly change some of the indicators identified by cyber security analysts. Some of the examples of such indicators are hash values, IP addresses and domains used by the activity groups. Any attribution also needs to have the associated confidence level (high, medium or low). An attribution with high confidence implies that evidence suggests that there is no doubt an activity group was responsible and there is no other alternative. An attribution with high confidence implies that evidence is convincing that an activity group may be responsible, but alternatives exist. An attribution with low confidence implies when significant body of evidence suggests one thing, but there are significant information gaps.

SUMMARY OF THE INVENTION

An object of the invention is to solve at least the above problems and/or disadvantages and to provide at least the advantages described hereinafter.

Therefore, an object of the present invention is to provide a system and method for determining the level of confidence in attributing a campaign to an activity group.

Another object of the present invention is to provide a system and method for identifying the gaps that need to be filled in order to determine attribution with high or moderate confidence.

Another object of the present invention is to provide a system and method for extracting key indicators from the campaign intrusion set data.

Another object of the present invention is to provide a system and method for creating a database of unique indicators associated with specific activity groups.

Another object of the present invention is to provide a system and method assist users in threat hunting by providing details on information gaps with regards to the techniques that need to be hunted for specific activity group.

To achieve at least the above objects, in whole or in part, there is provided a method of analyzing a campaign, comprising collecting intrusion set data, wherein the intrusion set data comprises data associated with a campaign, extracting key indicators from the intrusion set data, wherein the extracted key indicator data ("EKID") comprises quantifiable metrics associated with a campaign, collecting activity group data, wherein the activity group data comprises data associated with the threat activity groups, extracting capabilities and techniques from the activity group data, wherein the extracted activity group data ("EAGD") comprises quantifiable metrics associated with activity groups, comparing EKID with EAGD, and determining if EKID can be attributed to a known activity group with the associated confidence level based on a multi-stage comparison step.

To achieve at least the above objects, in whole or in part, there is also provided a system for attributing a campaign with the associated confidence level, comprising a processor, processor memory, and a cyber attribution engine comprising a set of computer readable instructions stored in processor memory that are executable by the processor to: receive intrusion-set data, wherein the intrusion-set data comprises data associated with a campaign, extract key indicators from the intrusion set data, wherein the extracted key indicator data ("EKID") comprises quantifiable metrics associated with a campaign, receive activity group data, wherein the activity group data comprises data associated with activity groups, extract capabilities and techniques from the activity group data, wherein the extracted activity group data ("EAGD") comprises quantifiable metrics associated with a activity group, compare the EKID with a the EAGD, and determine if the EKID can be attributed to a known activity group with the associated confidence level based on a multi-stage comparison step.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a table showing a simplified key indicators data for an activity group, in accordance with one preferred embodiment of the present invention;

DETAILED DESCRIPTION OF PREFERRED EMBODIMENTS

The present invention provides an approach to determine the confidence level in attributing a campaign to an activity group, identify information gaps in cases where the confidence level for attribution is determined moderate or low and provide the user of the invention key data points on which to perform threat hunting on the associated activity group. This is a highly specialized area that requires purpose-built analysis tools and methods. The present invention provides a system and method for determining the confidence level in attributing a campaign to an activity group that consists of an analysis mechanism, coupled with a database to store unique techniques that are specific to activity groups. The term "activity group" refers to a party or entity that can initiate or has initiated a cyber-attack that targets information networks and/or computer networks to achieve its objective. The term "campaign" refers to a set of incidents and indicators carried out by an activity group using tools, and specific techniques in order to achieve an objective. The term 'intrusion set' and 'campaign" is used interchangeably in this document. The present invention overcomes some of the challenges associated with attributing an intrusion set to an activity group and provides methods, systems and services which empower end-users to have previously unavailable insight into activity group responsible for the campaign, identify knowledge gaps that need to be addressed for a higher confidence attribution and provide key data points in performing threat hunting on an associated activity group.

The present invention allows for a multi-stage analysis of the intrusion data with the known activity groups data obtained from threat intelligence feeds or vendor reports. The present invention looks for the following key indicator data: (1) tools; (2) tactics, techniques and procedures (TTPs). This data may be utilized for determining attribution with a high degree of confidence and also identify gaps that need to be filled for performing attribution at a higher level of confidence. The data may additionally be leveraged for threat hunting and look for techniques that may attribute the intrusion set to an activity group.

Figure 1:
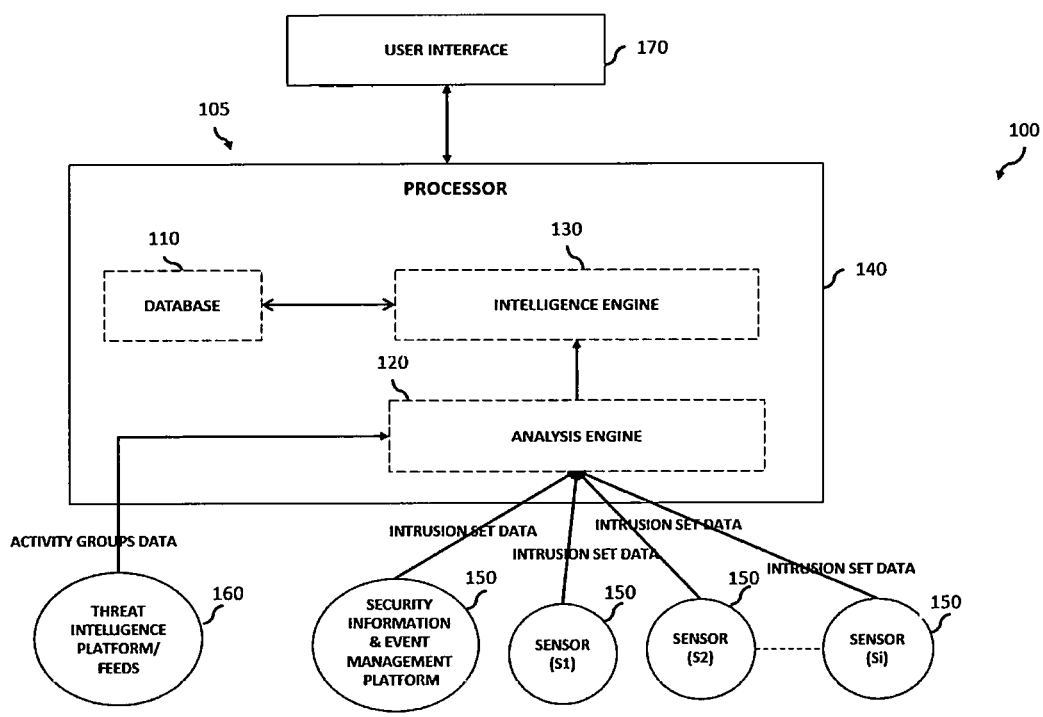
FIG. 1 is a block diagram that illustrates the major components of the High Confidence Cyber Threat Attribution System, in accordance with one preferred embodiment of the present invention.

FIG. 1 is a block diagram that illustrates the major components of a high confidence cyber threat attribution system 100, in accordance with one preferred embodiment of the present invention. The system 100 includes attribution engine 105 that comprises a database 110, an analysis engine 120 and an intelligence engine 130, all of which preferably run on at least one processor 140. The user interacts with the high confidence cyber threat attribution system through a user interface 170 to look for key indicators associated with an activity group and also modify predetermined thresholds. The analysis engine 120 collects intrusion set data from sensors 150 and activity groups data from threat intelligence feeds 160.

The database 110, analysis engine 120 and intelligence engine 130 are preferably each implemented with one or more programs or applications run by the processor 140 or by multiple processors. The programs or applications that implement the database 110, analysis engine 120 and intelligence engine 130 are respective sets of computer readable instructions that are stored in memory (not shown) that are accessed b, the processor 140.

The processor 140 can be implemented with any type of processing device, such as a general purpose desktop computer, general purpose laptop computer, a special purpose computer, a distributed computing platform located in a "cloud", a server, a tablet computer, a smartphone, a programmed microprocessor or microcontroller and peripheral integrated circuit elements, ASICs or other integrated circuits, hardwired electronic or logic circuits such as discrete element circuits, programmable logic devices such as FPGA, PLD, PLA or PAL or the like. In general, any device on which a finite state machine capable of running the software used to implement the analysis engine 120, the intelligence engine 130 and the database can be used as the processor(s)140.

As the invention is leveraged by the user, le database 110 will contain key indicators used by known activity groups for conducting their campaigns. The key indicators preferably contain previously observed quantitative data relating to the tools leveraged and the tactics, techniques and procedures used by an activity group. These key indicators will hereinafter be referred to as extracted activity group data (EAGD). The EAGD preferably include, the following categories of quantifiable metrics ("forensic categories'): (1) tools: custom or commercial code, operating system utilities, open-source software used by the activity group for its campaigns. Examples include PsExec, Metasploit, Mimikatz, PlugX, CHOPSTICK as well as Windows utilities such as Net, netstat and Tasklist. An activity group may use commonly available toolkits such as Metasploit or operating system utilities or a specialized software that is unique to an activity group (2) tactics, techniques and procedures (TTPs): TTPs refer to an activity groups behavior or tradecraft.

In addition to EAGD, the database 110 stores information about an activity group such as activity group name, aliases used, industry sectors in which the activity group operates, tools uses, tactics, techniques and procedures leverage. In addition, the database 110 may also store unique indicators associated with an activity group and tools and techniques it shares with other activity groups.

The Analysis Engine The analysis engine 120 is responsible for analyzing intrusion set data, collected from sensors and/or other data aggregation sources, such as Security Information and Event Management (SIEM) platform. This intrusion set data is analyzed in order to extract key indicator data (EKID) from the intrusion set, preferably EKID falling into one or more of the forensic categories. The intrusion set data may typically include, but is not limited to, log data from firewalls, proxy logs, logs from web application firewalls, intrusion detection and/or prevention system logs, net-flow data from network artifacts, such as routers and Switches, binary programs, file system, registry, network connectivity data and any other data generated by host-based agents, operating system logs, anti-virus logs, malware sandbox technologies, and EDR technologies. The intrusion set data is collected and transmitted to the analysis engine 120 by sensors 150 such as firewalls, proxy, intrusion detection systems, anti-virus and/or a log collector such as the Security Information end Event Management (SIEM) platform.

The analysis engine 120 is also responsible for analyzing activity group data, collected periodically from threat intelligence feeds, vendor threat intelligence reports and/or open source intelligence. This activity group data is analyzed in order to extract activity group data (EAGD). The activity group data may typically include, but is not limited to, IP addresses used for command and control, malicious domains, malicious file hashes, host artifacts, network artifacts, tools, and tactics, techniques and procedures. The activity group data is collected and transmitted to the analysis engine 120 by threat intelligence feeds 160. The EAGD is then stored in the database 110 as shown in FIG. 5.

The database 110, intelligence engine 130, analysis engine 120, sensors 150 and threat intelligence feeds 160 are preferably connected to one or more networks (hereinafter referred to as "network') through which they can communicate with each other.

The analysis techniques used by the analysis engine are preferably designed to extract key indicators from the activity group data and intrusion set data that fall into one or more of the forensic categories. For example, the analysis techniques can include, but are not limited to: analysis of tools used in order to determine the nature of the code, whether it is an open source code or a customized code or an operating system utility, and identify metadata that provides additional information on its authors. The analysis techniques can also be used to analyze techniques and procedures used in order determine the uniqueness of these techniques and procedures to an activity group such as process injections, registry modifications, modifying, deleting or encrypting files.

The analysis engine 120 can be easily reprogrammed by a user (e.g., an administrator or other user). Such that the way in which intrusion set data is processed, analyzed and derived into EKID can be modified. Such that the way in which activity group data is processed, analyzed and derived into EAGD can be modified. This reprogramming can be done via the user interface 170.

The Intelligence Engine

The analysis engine 120 sends the EKID to the intelligence engine 130 for further analysis. While the intelligence engine 130 may optionally perform many of the functions of the analysis engine 120, these functions are preferably performed by the analysis engine 120 for the purpose of scalability and efficiency. Specifically the intelligence engine 130 performs a multi-stage comparison of the EKID to the EAGD that is stored in the database 110 to determine the confidence level in attributing the given campaign to an activity group. The intelligence engine 130 can use any data correlation techniques known in the art for comparing the EKID to the EAGD and determining a match probability.

If the unique techniques value (Tu) is greater than the predetermined threshold, the intelligence engine 130 alerts the user that the intrusion set is attributed to an activity group with High Confidence. If the unique techniques value (Tu) is not greater than the predetermined threshold, the intelligence user 130 alerts the user with the confidence level and identified knowledge gaps knowledge gaps that need to be filled for further analysis.

System Operation

Figure 2:
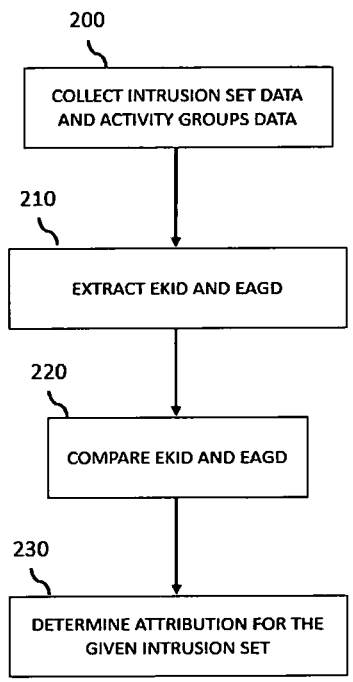
FIG. 2 is a flowchart illustrating steps in the operation of the high confidence cyber attribution system, in accordance with one preferred embodiment of the present invention.

FIG. 2 is a flowchart illustrating steps in the operation of the high confidence cyber threat attribution system 100, in accordance with one preferred embodiment of the present invention. The process starts at step 200, the given intrusion set data and activity group indicator data is collected. Then, at step 210, where intrusion set data and activity group data is analyzed to extract EKID and EAGD. This step is preferably performed by the analysis engine 120. Then, at step 220, EKID is compared to EAGD. This step is preferably performed at 130. Then, at step 230, the system determines the attribution for a given intrusion set to an activity group with the associated confidence level.

Figure 3:
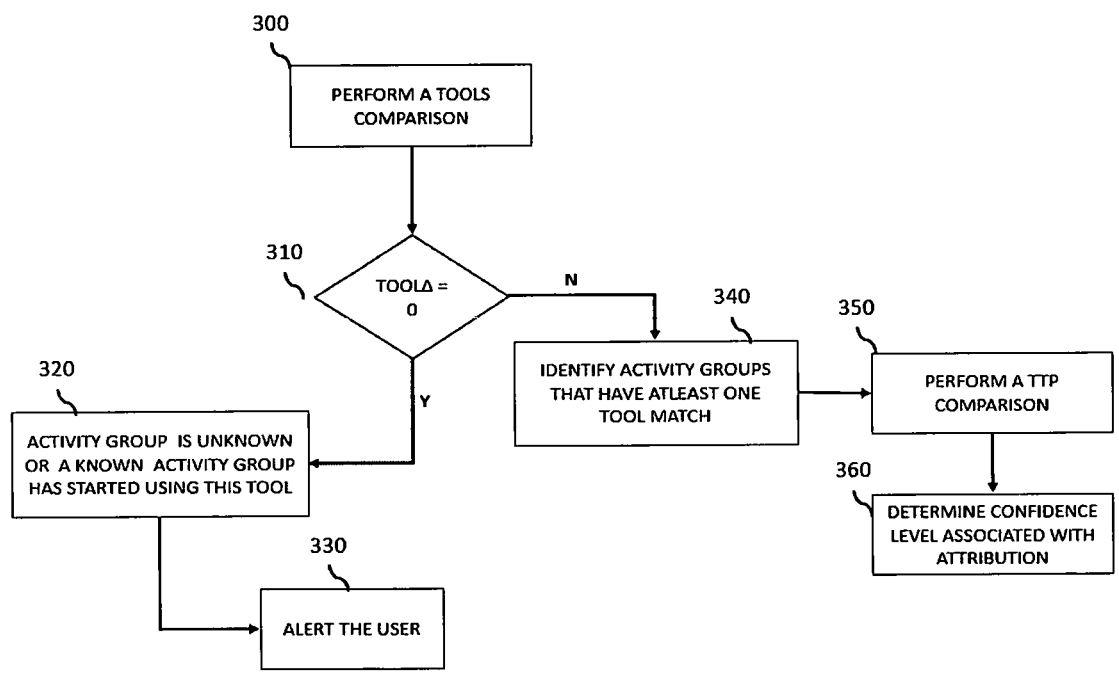
FIG. 3 is a flowchart illustrating one example of how steps 220 and 230 of FIG. 3 can be implemented, in accordance with one preferred embodiment of the present invention.

FIG. 3 is a flowchart illustrating one example of how steps 220 and 230 can be implemented, in accordance with one preferred embodiment of the present invention. The process starts at step 300, where a tools comparison is made between the tools identified in EKID and that in EAGD. Then, at step 310, a decision logic is followed that identifies if at all there is a match. Then, at step 320, if there is no tool match, the user is alerted that attribution cannot be determined as the activity group is unknown or an activity group has started using the tool that it didn't use previously. Then, at step 340, all the activity groups are identified that have at least one tool match with the tools identified it EKID. Then, at step 350, a TTPs comparison is made between those identified in EKID and the identified activity groups. Then, at step 360, the attribution for the given intrusion set to an activity group is determined with the associated level of confidence.

Figure 4:
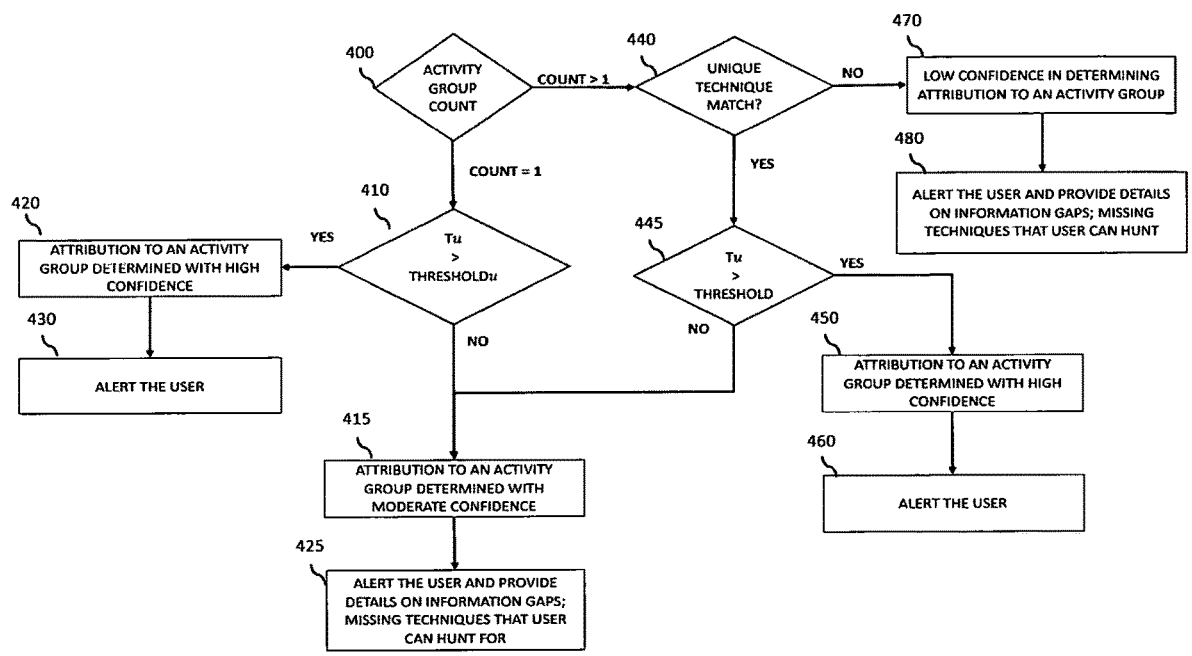
FIG. 4 is a flowchart illustrating one example of how step 350 and 360 of FIG. 3 can be implemented, in accordance with one preferred embodiment of the present invention.

FIG. 4 is a flowchart illustrating one example of how steps 350 and 360 can be implemented, in accordance with one preferred embodiment of the present invention. The process starts at step 400, where an activity group count is made. If activity group count is 1, then, at step 410, the unique techniques values (Tu) is compared with the predetermined threshold. If the Tu is greater than the predetermined threshold, then, at step 420, the intrusion set is attributed to the activity group with high confidence. Then, at step 430, the user is alerted that the system has high confidence in attributing the intrusion set to the activity group and the system also provides details about the activity group in terms of the tools and techniques the activity group uses and the sectors in which it operates. If the Tu is not greater than the predetermined threshold, then, at step 415, the intrusion set is attributed to the activity group with moderate confidence. Then, at step 425, the user is alerted that the system has moderate confidence in attributing the intrusion set to the activity group. The user is also provided unique techniques associated with this activity group in order for the user to hunt for such techniques. If the user is successfully able to hunt for such techniques within his or her environment, the user though the user interface updates the database. This triggers a recalculation and if Tu is greater than the predetermined threshold, then the user is alerted that the system now has high confidence in attributing the intrusion set to an activity group. If the activity group count is greater than 1, then, at step 440, a decision logic is followed to identify activity groups with the unique techniques match. If there is a unique techniques match with an activity group, then, at step 445, the unique techniques values (Tu) is compared with the predetermined threshold. If the Tu is greater than the predetermined threshold, then, at step 450, the intrusion set is attributed to the activity group with high confidence. Then, at step 460, the user is alerted that the system has high confidence in attributing the intrusion set to the activity group. If the Tu is not greater than the predetermined threshold, then, steps 415 and 425 are followed. If the Tu is equal to zero, then, at step 470, it is determined that the system has low confidence in attributing the intrusion set to an activity group. Then, at step 480, the user is alerted and that system has low confidence in attributing an intrusion set to an activity. The user is also provided unique techniques associated with this activity group in order for the user to hunt for such techniques. If the user is successfully able to hunt for such techniques with his or her environment, the user though the user interface updates the database. This triggers a recalculation and the system alerts the user if there is bump in the confidence level.

This is accomplished by using any correlation techniques and/or data correlation models known in the art. However, the data correlation model is preferably driven via a predetermined understanding of the weight that each data point within a given activity group may carry.

Hypothetical Scenario

The principles of operation of the high confidence attribution system 100 will now be further illustrated in the context of a hypothetical scenario. In the hypothetical scenario, the database 110 contains EAGD that include a profile of a sophisticated activity group ("Wizard Spider"). The key indicators stored in the database 110, such as the sample shown in FIG. 5, details several unique tools and techniques utilized by WizardSpider. In addition, database 110 contains EAGD regarding the sectors in which WizardSpider has operated. In this hypothetical scenario, the high confidence cyber threat attribution system system 100 preferably executes the following process:

1. Activity group data is collected by the analysis engine 120 from the threat intelligence feeds 160 on a periodic basis. EAGD is extracted and stored in the database 110.
2. New intrusion set is collected by the analysis engine 120 from the sensors 150.
3. The analysis engine 120 extracts key indicator data (EKID) from the intrusion set and transmits to the intelligence engine 130.
4. The intelligence engine 130 receives the EKID from the analysis engine 120 and the EAGD from the database 110, and performs a multi-stage comparison between the EKID and the EAGD. The intelligence engine determines that Tu is greater than the threshold that system has high confidence that the intrusion set can be attributed to WizardSpider. This is based on the unique tools and techniques specially leveraged by WizardSpider and that the same are identified in the intrusion set.
5. This triggers an alert which is communicated to the user via the user interface 170 that the system has high confidence in attributing the intrusion set to WizardSpider

What is claimed is:

1. A method for determining a confidence level for cyber threat attribution of an ongoing campaign, comprising:

collecting intrusion set data from sensors, wherein the intrusion set data comprises of associated indicators of compromise;

collecting activity group data from Threat Intelligence feeds or Vendor Threat Intelligence reports;

extracting quantitative indicator data "EKID" from the intrusion set data using at least a second processor, wherein the EKID comprises tools, tactics, techniques and procedures associated with the intrusion set;

extracting an activity group indicator data "EAGD" using at least a second processor, wherein the EAGD comprises tools, tactics, techniques and procedures associated with the activity group;

comparing the EKID with the EAGD using at least the second processor, wherein the comparison step comprises of identifying common tools and techniques between EKID and EAGD;

determining if the EKID is attributed to a known activity group with associated confidence level based on the comparison step;

Determining whether the EKID is attributed to a known activity group with the associated confidence level by:

determining correlation levels between the tools within the EKID and the tools within the EAGD;

determining correlation levels between the tactics, techniques and procedures within the EKID and the tactics, techniques and procedures within the EAGD of those activity groups that use at least one tool identified within EKID;

determining attribution to an activity group with high confidence if unique techniques (Tµ) value exceeds a predetermined threshold;

determining attribution to an activity group with moderate confidence if unique techniques (Tµ) value does not exceed a predetermined threshold;

determining the attribution to an activity group with low confidence if the unique techniques (Tµ) value is equal to zero;

determining the information gap in the event attribution to an activity group is determined with moderate or low confidence, wherein the information gap comprises of an assessment on a quality of the intrusion set; and providing analysis to user based on the determined information gap with regards to the tactics and techniques needed to be applied to detect malicious activities with an associated activity group within the user environment, wherein the activity group is an entity who had conducted a cyber-attack.

* * * * *